United States Patent
Vinther et al.

(10) Patent No.: US 12,553,008 B2
(45) Date of Patent: Feb. 17, 2026

(54) EXTRACTING AND REFINING PLANT CUTICULAR WAXES FROM AQUEOUS DISPERSION USING TEMPERATURE AND pH ADJUSTMENT

(71) Applicant: JENA TRADING APS, Høng (DK)

(72) Inventors: Per Vinther, Høng (DK); John Mark Lawther, Roskilde (DK)

(73) Assignee: JENA TRADING APS, Høng (DK)

( * ) Notice: Subject to any disclaimer, the term of this patent is extended or adjusted under 35 U.S.C. 154(b) by 905 days.

(21) Appl. No.: 17/607,300

(22) PCT Filed: Apr. 30, 2020

(86) PCT No.: PCT/EP2020/062074
§ 371 (c)(1),
(2) Date: Oct. 28, 2021

(87) PCT Pub. No.: WO2020/221877
PCT Pub. Date: Nov. 5, 2020

(65) Prior Publication Data
US 2022/0333037 A1    Oct. 20, 2022

(30) Foreign Application Priority Data
Apr. 30, 2019    (EP) .................................. 19171899

(51) Int. Cl.
*C11B 11/00*    (2006.01)
*B01D 11/02*    (2006.01)

(52) U.S. Cl.
CPC .......... *C11B 11/00* (2013.01); *B01D 11/0288* (2013.01)

(58) Field of Classification Search
CPC ..... C11B 11/00; B01D 11/0288; Y02W 30/74
See application file for complete search history.

(56) References Cited

U.S. PATENT DOCUMENTS

| 1,309,999 | A | 7/1919 | Bunker |
| 1,715,194 | A | 5/1929 | Garcia |

(Continued)

FOREIGN PATENT DOCUMENTS

| BR | 9006044 | 6/1991 |
| CN | 101225448 | 7/2008 |

(Continued)

OTHER PUBLICATIONS

Anonymous. Definition of Straw, Merriam-Webster (2019), downloaded from https://www.merriam-webster.com/dictionary/straw on Nov. 19, 2019 (Year: 2019).

(Continued)

*Primary Examiner* — Deborah D Carr
(74) *Attorney, Agent, or Firm* — Lisa Mueller; Casimir Jones SC

(57) ABSTRACT

The present invention concerns a method of extracting and refining wax from plant material. Briefly, the method comprises the steps of (a) providing plant material comprising cuticular wax, (b) disassociating cuticular wax from the plant material by subjecting said plant material to a dry mechanical treatment and suspending the dry mechanically treated material, or a fraction thereof, in an aqueous solution comprising protease and/or pectinase enzymes, thereby obtaining a sample comprising plant derived cuticular wax and dewaxed plant material in an aqueous suspension, (c) solubilizing the plant derived cuticular wax by increasing the temperature of the sample, (d) separating the suspension into a solid fraction and a liquid fraction comprising melted plant derived cuticular wax, (e) adjusting the pH and temperature of the liquid fraction to pH 5.5 or lower and 50° C. or lower, respectively, (f) separating the mixture into a waxy fraction and an aqueous fraction, (g) recovering the plant derived cuticular wax from the waxy fraction.

20 Claims, 4 Drawing Sheets

(56) References Cited

U.S. PATENT DOCUMENTS

| | | | |
|---|---|---|---|
| 2,275,630 | A | 3/1942 | Johnson et al. |
| 2,275,661 | A | 3/1942 | Vernon et al. |
| 2,662,893 | A | 12/1953 | Kuth |
| 2,781,336 | A * | 2/1957 | Zenczak ............... C08H 6/00 260/1 |
| 2,804,271 | A | 8/1957 | Pressing et al. |
| 3,006,938 | A | 10/1961 | West |
| 7,972,826 | B2 | 7/2011 | Larsen et al. |
| 8,123,864 | B2 | 2/2012 | Christensen et al. |
| 8,187,848 | B2 | 5/2012 | Larsen et al. |
| 8,187,849 | B2 | 5/2012 | Larsen |

FOREIGN PATENT DOCUMENTS

| | | | |
|---|---|---|---|
| CN | 102329693 | | 1/2012 |
| CN | 102864015 | | 1/2013 |
| CN | 106574207 | A | 4/2017 |
| CN | 107075409 | A | 8/2017 |
| CN | 107557165 | A | 1/2018 |
| CN | 109161395 | A | 1/2019 |
| DE | 4431394 | | 2/1996 |
| GB | 1056468 | | 1/1967 |
| JP | 2018529627 | A | 10/2018 |
| WO | WO 95/16013 | | 6/1995 |
| WO | WO 03/092628 | | 11/2003 |
| WO | WO 2006/047445 | | 5/2006 |
| WO | WO 2006/082437 | A1 | 10/2006 |
| WO | 2015028299 | A1 | 3/2015 |
| WO | WO 2015185685 | | 12/2015 |
| WO | WO-2015185685 | A1 * | 12/2015 ............... C10L 5/44 |

OTHER PUBLICATIONS

Anonymous. Proteases for Biocatalysis; Novozymes, pp. 1-4, downloaded from: file:///c:/USERS/pmartin1/Downloads/Biocatlysis_brochure_Proteases.pdf on Nov. 19, 2019 (Year: 2019).

Sin, Emily; "Table 1.1: Common Wax Classes" The extraction and fractionation of waxes from biomass, Jun. 2012, p. 41.

Sin, Emily; "Figure 2.43: Typical GC chromatogram of solvent wheat straw wax (Viscount 09) extract (originally in colour)," The extraction and fractionation of waxes from biomass, Jun. 2012, p. 118.

Deswarte, Fabien. Towards a Wheat Straw Based Biorefinery, Wheat for Biofuels, Bioenergy and High Value Bioproducts Conference (2008) pp. 1-26 downloaded from https://www.soci.org/news/agrisciences/bioresources-wheat-for-biofuels-paper on Nov. 29, 2017 (Year: 2008).

International Search Report and Written Opinion for Application No. PCT/EP2015/062497 dated Sep. 22, 2015 (9 pages).

International Search Report and Written Opinion for Application No. PCT/EP2020/062075 dated Jul. 24, 2020 (12 pages).

International Search Report and Written Opinion for Application No. PCT/EP2020/062074 dated Jul. 17, 2020 (12 pages).

TBH Web Team: "From Desert Plants to Dollars: Candelilla Wax Makind, and Wax Products." The University of Texas at Austin, Apr. 20, 2004 Retrieved from the Internet: URL: http://www.texasbeyondhistory.net/waxcamps/techniques. Html [retrieved on Sep. 9, 2015].

Written Opinion of the International Preliminary Examining Authority for PCT/EP2015/062497 dated May 11, 2016 (7 pages).

Search Report from Danish Patent and Trademark Office for Application No. 70324 dated Nov. 24, 2014 (3 pages).

Han NR, et al. The β-sitosterol attenuates atopic dermatitis-like skin lesions through down-regulation of TSLP. Exp Biol Med (Maywood). Apr. 2014; 239(4):454-64.

Haiyuan Yu, et al. The protective effects of β-sitosterol and vermicularin from *Thamnolia vermicularis* (Sw.) Ach. against skin aging in vitro. An Acad Bras Cienc. Dec. 2, 2019; 91(4):e20181088.

Salen G, et al. Metabolism of beta-sitosterol in man. J Clin Invest. May 1970; 49(5):952-67.

Lomenick B, et al. Identification and characterization of β-sitosterol target proteins. Bioorg Med Chem Lett. Nov. 1, 2015; 25(21):4976-4979.

Kurano M, et al. Sitosterol prevents obesity-related chronic inflammation. Biochim Biophys Acta Mol Cell Biol Lipids. Feb. 2018; 1863(2):191-198.

Kim SJ, et al. Antiinflammatory effect of Oldenlandia diffusa and its constituent, hentriacontane, through suppression of caspase-1 activation in mouse peritoneal macrophages. Phytother Res. Oct. 2011; 25(10):1537-46.

* cited by examiner

EXTRACTING AND REFINING PLANT CUTICULAR WAXES FROM AQUEOUS DISPERSION USING TEMPERATURE AND pH ADJUSTMENT

FIELD OF THE INVENTION

The present invention concerns a method of extracting and refining cuticular wax from plant material.

BACKGROUND OF THE INVENTION

Plant waxes are provided typically from two different processes, the first being as a by-product from vegetable oil production, to which group waxes such as soy wax, rape seed wax, cotton seed stearin, rice bran wax, and palm wax belong, and the second process of more or less artisanal production of natural waxes such as Candelilla wax, Carnauba wax, and Ouricury wax. Also wax products such as Jojoba wax or Castor wax are commercially available. Other commercially relevant wax sources are montan wax, bees wax, lanolin, synthetic wax, and paraffin waxes, the latter being by far the largest by volume, originated as a by-product from petrochemical refining.

Vegetable oil originating waxes are often used in candle production as they are characterized by a medium/low melting point and therefore less suitable for more demanding applications requiring thermal resistance and also shine/gloss—as for example car wax, boat wax, and cosmetics. These characteristics are met by paraffin waxes and synthetic waxes, supplemented with the "premium" natural waxes Carnauba or Candelilla wax.

The mineral/fossil waxes represent approximately 75% of global wax production, with synthetic waxes accounting for further 20%, a total of 95%. The remaining waxes make up less than 5% of global production, and this scarcity is a major barrier against increased use of natural waxes.

With increased interest in fossil-free ingredients and materials, there is a significant demand also for wax produced from renewable sources. The natural waxes are as mentioned above scarce, in fact, the availability of such waxes is far from enough to substitute paraffin, and attempts to increase farming of the plants supplying Candellila (*Euphorbia antisyphilitica*), Carnauba (*Copernicia prunifera*), and Ouricury (*Syagrus coronata*) wax has so far been unsuccessful; and over-exploitation of sources such as the Candelilla shrub is leading to further shortages of in demand natural waxes.

When supply is limited, security of supply for large volume applications, like cosmetics, paint, polish, becomes a problem. To overcome this problem a natural wax has to be abundant and provide acceptable quality, defined for example by its melting point, hardness, and/or color.

Extraction of wax from lignocellulosic plant material, such as bark, has previously been described (U.S. Pat. No. 2,781,336), where bark is treated using an aqueous solution of a base (at room temperature or heated). Solids (i.e. cellulosic residues) are then separated from the mother liquor, and the mother liquor is neutralized using acid, whereby a precipitate forms. Waxes are finally extracted from this precipitate using benzene. The method thereby uses a very harsh basic treatment of the biomass, which may not be applicable to some types of biomass and wax for selected downstream applications. For example, it is likely that a combination of alkali and heat will split the ester components of wheat straw wax into parent fatty acids and alcohols, yielding an unfavorable wax composition for downstream applications, such as for use in cosmetics.

It has previously been shown that wax can be extracted from numerous plants, including cereals, grasses, etc (WO 2015/185685). As an example, wheat straw has a wax content of 1-3%. Annual global wheat production exceeds 700 million ton, bringing an estimate 3-400 million ton of straw. The global potential supply of wheat straw wax could therefore be 3-9 million ton, which is magnitudes more that the current supply of natural waxes. Expanding that to other common agricultural crops, there is a large potential to utilize a harvest waste product and further to fulfill the supply demand of industries that wish to introduce larger quantities of natural waxes into their product lines. Although the agricultural base is there to provide abundant quantities of wax, the very low wax content in the plant biomass and subsequent dilution in the extraction process, makes it very difficult to recover the wax at reasonable yields with conventional techniques, without resolving to solvent extraction methodologies.

The present invention concerns a method of refining wax from common agricultural plant material, such as cereal straws.

Previously described methods to dewax plant material by combination of mechanical, thermal, and enzymatic methods have in common that an aqueous liquid is added together with enzymes during the dewaxing process. The released wax is thus diluted, dissolved, suspended or otherwise present in a larger volume, hence at lower concentrations. If e.g. a straw slurry of 20% dry matter (DM) is used, the 1% wax in straw becomes a 0.2% wax in aqueous slurry.

Current main refining tool for natural waxes such as bees wax, carnauba wax and candelilla wax is filtration of molten wax (usually kept below 100° C.), using an industrial filter press. As an example, with Carnauba wax, filtration, centrifugation and bleaching are usually performed: the crude wax is boiled in water, followed by filtration and separation of the wax from the water. The isolated wax from this is then melted and filtered again. As another example, with Candelilla wax, the wax is melted and then filtered through a suitable matrix such as "Fullers Earth" ("bleaching earth") or active carbon; and/or it can optionally be further bleached using hydrogen peroxide. As yet another example, with beeswax, simple melting and filtration is performed.

Depending on the application of the extracted wax, wax color may be of high relevance—e.g. in cosmetics. In order to compare the color of waxes, the Gardner color method may be employed. The Gardner color scale is a range from 1 (white) to 18 (dark brown). As seen in table 1, cereal straw waxes traditionally appear darker compared to the refined commercial waxes.

TABLE 1

Gardner color for commercial and cereal waxes[1]

| Type of wax | Gardner color |
|---|---|
| Commercial waxes | |
| Lanolin | 9 |
| Beeswax | 3 |
| Candellila wax | 9 |
| Carnauba wax | 9 |

TABLE 1-continued

Gardner color for commercial and cereal waxes[1]

| Type of wax | Gardner color |
|---|---|
| Cereal straw waxes | |
| Wheat straw wax | 18 |
| Barley straw wax | >18 |
| Oat straw wax | >18 |

[1]Sin E. H. K. 2012. PhD thesis: The extraction and fractionation of waxes from biomass, University of York.

The present invention provides an improved method for refining natural waxes, a gentle method which further overcomes the difficulties of isolating a product in low concentration and provides a highly pure wax product compared to current refining tools used for natural waxes.

SUMMARY OF THE INVENTION

A first aspect of the invention concerns a method of extracting and refining cuticular wax from plant material, said method comprising the steps of
   a. providing plant material comprising cuticular wax,
   b. disassociating cuticular wax from said plant material provided in step (a), thereby obtaining a sample comprising plant derived cuticular wax and dewaxed plant material in an aqueous suspension,
   c. solubilizing said plant derived cuticular wax by increasing the temperature of the sample obtained in step (b) to a temperature greater than the melting point of said plant derived cuticular wax,
   d. separating the suspension obtained in step (c) into a solid fraction and a liquid fraction, wherein said liquid fraction comprises melted plant derived cuticular wax,
   e. adjusting the pH and temperature of the liquid fraction from step (d) to pH 5 or lower and 50° C. or lower, respectively,
   f. separating the mixture obtained in step (e) into a waxy fraction and an aqueous fraction,
   g. recovering plant derived cuticular wax from said waxy fraction from step (f)

A second aspect of the invention concern a refined plant derived wax product obtainable by the method described above, wherein said plant wax product comprises less than 1% solvent, such as ethanol.

A third aspect of the invention concerns a plant wax composition obtainable by the method described above for use in cosmetics.

DETAILED DESCRIPTION OF THE INVENTION

Definitions

"Dewaxed plant material" means plant material which has been treated in a way that removes/disassociates cuticular wax from the plant material, such as more than 50, 55, 60, 65, 70, 75, 80, 85, 90%, or even more than 95% of all plant wax has been removed, wherein the wax content is determined by the method provided in section II of this application.

"Plant or lignocellulosic material" or "plant or lignocellulosic biomass" means a wide and varied group of plant parts from many species. The terms plant and lignocellulosic material are used interchangeably. Plant material that may be used as starting material in the present invention comes from multicellular, macroscopic plants comprising stem and leaves which are (at least one of them) sheathed by an outer layer or epidermis that is coated with a waxy waterproof protective layer, which is punctuated by specialized pores, known as stomata, which regulate gas and water exchange.

"Cereal straws" means the stems and leaves of the cereal plant remaining after harvest of the cereal grains. "Wax" or "wax components" means all various forms of wax coated on the surface of the plant material. It is collectively used to describe the waxy components of cuticles (cuticular wax) covering the areal parts of plants, including wax at the surface of the plant (epicuticular wax) as well as wax just below the surface of the plant (intracuticular wax). Wax comprises linear very-long chain (VLC) compounds, including varying ratios of fatty acids, primary and secondary alcohols, esters, aldehydes, free fatty acids, alkanes, and ketones. In addition, cyclic compounds such as pentacyclic triterpenoids, alkylresorcinols, sterols, and steryl esters occur in the wax of many species. Lipids making up plant cell walls in macroscopic or in microscopic (unicellular) plants are not considered "wax" as such in the present context, but may be present in a small amount in the final wax product if liberated during the mechanical and/or enzymatic treatment.

The Invention

The present invention concerns refining of cuticular wax from plant material

1. Method of Refining Wax

Figure 1:
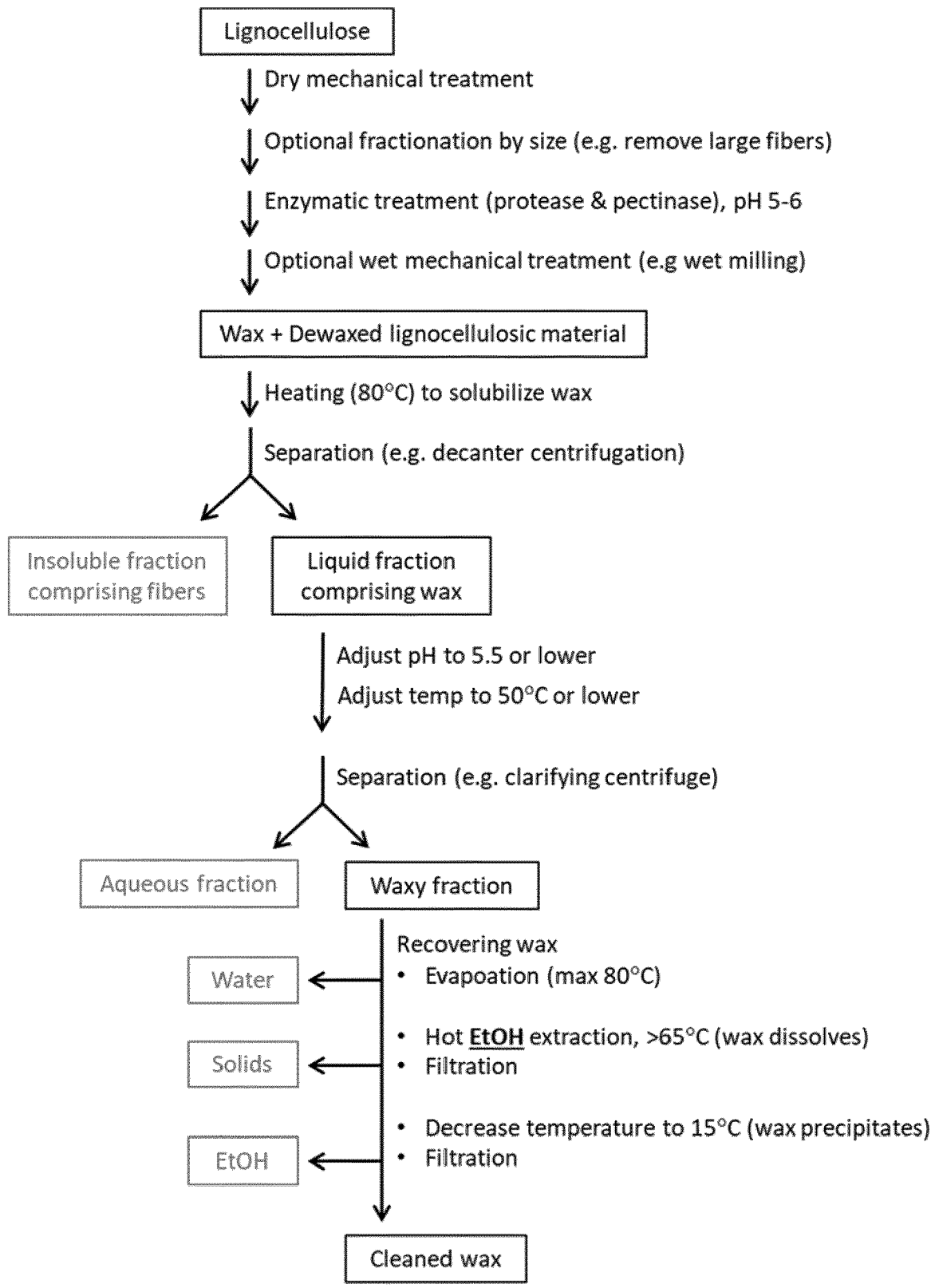
FIG. 1: a flow chart outlining different process steps of the invention, such as the process described in example 1.

FIG. 1 provides an illustrative example of the present invention, outlining the different process steps to arrive at the desired products. All process steps may be performed as illustrated, some steps may be left out, some steps may be combined, and additional steps may be added. A detailed description is given in the following sections.

In one aspect, the present invention concerns a method of refining cuticular wax from plant material, yielding an improved wax product with desired properties for further downstream processing. In a preferred embodiment, the present invention provides a method of refining wax, comprising the steps of:

(a) providing plant material comprising cuticular wax,
(b) disassociating said cuticular wax from said plant material provided in step (a), thereby obtaining a sample comprising plant derived cuticular wax and dewaxed plant material in an aqueous suspension,
(c) solubilizing said plant derived cuticular wax by increasing the temperature of the sample obtained in step (b) to a temperature greater than the melting point of said plant derived cuticular wax,
(d) separating the sample obtained in step (c) into a solid fraction and a liquid fraction, wherein said liquid fraction comprises melted plant derived cuticular wax,
(e) adjusting the pH and temperature of the liquid fraction from step (d) to pH 5.5 or lower and 50° C. or lower, respectively,
(f) separating the mixture obtained in step (e) into a waxy fraction and an aqueous fraction,
(g) recovering plant derived cuticular wax from said waxy fraction from step (f)

In another embodiment, the present invention provides a method as described above in steps (a)-(g), further comprising the step of:

(h) bleaching said plant derived cuticular wax recovered in step (g).

In yet another embodiment, the present invention provides a method as described above in steps (a)-(g), optionally including step (h), further comprising the step of:

(i) formulating said plant derived wax recovered in step (g) or said bleached wax obtained in step (h) into valuable products.

According to step (a) of the method of the present invention, plant material comprising cuticular wax is provided. In one embodiment of the invention, the plant material originates from agricultural crops such as cereals, sugar cane, palm trees, high energy grasses. In a preferred embodiment, the dewaxed lignocellulosic material of the invention originates from cereal, selected from the group consisting of wheat, rye, barley, oats, sorghum, rice, triticale, etc. and combinations thereof. In another embodiment the dewaxed lignocellulosic material of the invention originates from a high energy grass such as *Miscanthus*. The plant material may be provided in different form, such as untreated natural plant material, or processed such as in the form of e.g. pellets.

In one embodiment, plants which have waxes comprising a portion of (up to 12-13%) long-chain fatty acids are preferred for the stepwise processing of the present invention of isolating and efficiently up-concentrating the waxes into a wax rich precipitate, ready for further refining, described in details herein. These plants include cereal straws and grasses, rapeseed straw, maize stems, carnauba wax yielding plants (e.g. *Copernicia prunifera, Copernicia cerifera*), candelilla wax yielding plants (e.g. *Euphorbia antisyphilica*, the candelilla plant, or cactus). Further pineapple leaves and banana leaves. In fact most known wax bearing leaves are excellent sources of plant material for the method of the present invention. In a preferred embodiment, the dewaxed lignocellulosic material of the invention originates from cereal straw, selected from the group consisting of wheat, rye, barley, oats, sorghum, rice, triticale, etc. and combinations thereof; most preferably from wheat straw. Such cereal straws are the stems and leaves of the plant remaining after harvest of the cereal grains.

According to step (b) of the method of the present invention, wax is disassociated from the plant material provided in step (a), thereby obtaining a sample comprising plant derived wax and dewaxed plant material in an aqueous suspension. In one embodiment, plant material has in step (b) been treated in a way whereby more than 50% of the wax has been disassociated with the remaining plant material, such as treated in a way providing a sample comprising plant derived wax and dewaxed plant material, wherein more than 55, 60, 65, 70, 75, 80, 85, 90%, or even more than 95% of the wax in the original plant material has been disassociated from the plant material, yet is still present in the sample.

Wax may in step (b) be disassociated from the plant material by any known method in the art, such as by mechanically stripping the wax from the surfaces or even by hydrothermal and wet oxidation pretreatment.

In one embodiment, wax is disassociated from plant material by a mechanical method. In another embodiment, wax is disassociated from plant material by enzymatic treatment using enzymes suitable for degrading proteins associated with the cuticular wax in the plant material. In a preferred embodiment, wax is disassociated from plant material by a method using a combination of mechanical and enzymatic treatment, wherein the enzymatic treatment is facilitated by enzymes suitable for degrading proteins associated with the wax in the plant material. A similar method of dewaxing plant material is described in WO 2015/185685.

In one embodiment, the plant material is subjected to a dry mechanical treatment. Thus, in one embodiment of the present invention the dry mechanical treatment comprises cutting, chopping, and/or crushing, such as a mechanical treatment is selected from the group consisting of shredding, hammer milling, disc milling grinding and combinations thereof. In some embodiments, the plant material may need to be dried prior to the dry mechanical treatment. As part of the dry mechanical treatment, the plant material may be cut in lengths suitable for a subsequent treatment in a suitable mill for deforming the plant material. The primary chopping may results in cuts between about 5 and 20 cm in length, between 5 and 15 cm, or between 5 and 10 cm in length. The milling further minces the plant material to pieces of less than 5 cm in length, less than 3 cm, less than 2 cm, or less than 1 cm. The processes equipment can be adjusted to optimize the sizes of the plant material according to the downstream use of the mechanically treated plant material.

The dry mechanical treatment may serve to deform the outer surface of the plant material, preferably after drying, so that the wax coating is cracked and released, obtaining a partly dewaxed plant material, and to open the plant material surface to help facilitate penetration of water during subsequent wet-processing.

The material obtained after dry mechanical treatment is optionally fractionated by size. In one embodiment of the present invention, fractionation is done by a sieving treatment in order to obtain two fractions, the first fraction passing through the sieve mesh and the second fraction being retained by the sieve mesh. The mesh size of such sieve is in the range of 2-12 mm, such as in the range from 4-10 mm e.g. in the range from 6-8 mm. In a preferred embodiment, the mesh size is 8 mm. The sieving treatment may comprise one or more sieves having the same or different mesh sizes. The sieving treatment may be performed in order to separate a fraction enriched in cracked and released wax (the first fraction passing through the sieve) from a fraction of partly dewaxed plant material (the second fraction retained by the sieve).

In one embodiment, the dry mechanically treated material or a selected fraction of the dry mechanically treated material is suspended in an aqueous solution comprising one or more protease and/or pectinase enzymes, and the temperature and pH are preferably adjusted to optimize the activity of the enzyme(s) added.

Proteases are involved in digesting long protein chains into shorter fragments by splitting the peptide bonds that link amino acid residues. In one embodiment, the proteases may be selected among proteases which detach the terminal amino acids from the protein chain (exopeptidases, such as aminopeptidases, carboxypeptidase A). In another embodiment, proteases may be selected among pectinases which attack internal peptide bonds of a protein (endopeptidases, such as trypsin, chymotrypsin, pepsin, papain, elastase); or from the group consisting of serine proteases, threonine proteases, cysteine proteases, aspartate proteases, glutamic acid proteases and metalloproteases. In yet another embodiment the proteases may be selected from commercially available proteases, such as selected from the group consisting of Alcalase®, (a protease from *Bacillus licheniformis*) Neutrase® (a protease from *Bacillus amyloliquefaciens*, both being available from Novozymes, Denmark) and Promod® (a protease from *Ananas comosus*, available from BioCatalysts, UK). In yet another embodiment, a combination of two or more protease enzymes or commercial protease enzyme products may be used for degrading the plant proteins.

Pectinases are involved in breaking down pectin, a polysaccharide found in plant cell walls, wherein e.g. cellulose fibrils are often embedded. In one embodiment, the pectinases may be selected from a group consisting of (I) pectin hydrolases which hydrolyse the pectic acid backbone in pectins (endopolygalacturonase, EC 3.2.1.15; exopolygalacturonase, EC 3.2.1.67), (II) pectin lyases which degrade pectic acid via elimination reactions (endopolygalacturonase lyase, EC 4.2.2.2; exopolygalacturonase lyase, EC 4.2.2.9; endopolymethyl-d-galactosiduronate lyase, EC 4.2.2.10), and (III) pectin esterase, which cleave the methyl ester bond (pectin methyl esterase, EC 3.1.1.11). Pectinases are widely available commercially and most are blends which incorporate all three mentioned enzyme types. In another embodiment, the pectinases may be selected from a group consisting of Pectinex® (a mix of pectinases from *Aspergillus Niger*, available from Novozymes, Denmark) and Pectinase 947 L® (a pectinase mix available from BioCatalysts, UK; Pektozyme, a range of Pectin active enzyme blends supplied by DuPont). In yet another embodiment, a combination of two or more pectinase enzymes or commercial pectinase enzyme products may be used for degrading the plant pectins.

A combination of two or more protease(s) and/or pectinase(s) and/or commercial protease product(s) and/or commercial pectinase product(s) may be applied for degrading the plant proteins and/or pectins.

In an embodiment the one or more enzymes may be added to the mixture to obtain an enzyme concentration in the range from 0.01-2% w/w, such as in the range of 0.03-1.8% w/w, e.g. in the range of 0.05-1.6% w/w, such as in the range of 0.07-1.4% w/w, e.g. in the range of 0.09-1.2% w/w. The enzyme concentration depend on the enzyme activity however, it may be preferred that the enzyme concentration in the mixture is 1-2% w/w. In one embodiment of the present invention it may be preferred that the enzyme activity is in the range from 1000-12000 U/g, such as in the range of 2000-10000 U/g, e.g. in the range of 3000-9000 U/g, such as in the range of 4000-8000 U/g, e.g. in the range of 5000-7000 U/g.

In order to benefit as much as possible from the enzyme treatment, the conditions for enzyme activity, such as temperature, pH, salt concentration, etc., should be optimized with respect to the enzyme(s) used. Addition of acid or base to the slurry/mixture may be necessary to reach optimal pH conditions.

Optimal temperature during enzyme treatment is selected to suit the enzyme(s) used. The temperature may be 25, 30, 35, 40, 45, 50° C. or even higher if thermostable enzymes are used. In one embodiment, the temperature during enzyme treatment is adjusted in the range of 30-70° C., such as in the range of 35-65° C., e.g. in the range of 40-60° C., e.g. in the range of 45-55° C., preferably in the range of 45-65° c., most preferably in the range of 50-60° C. to optimize the activity of the enzymes used in performing targeted hydrolysis of cell wall components.

In a further embodiment, the pH during enzyme treatment is in the range of 3.5-7.0, such as in the range of 4.0-7.0, e.g. in the range of 4.0-6.0, preferably in the range 4.5-6.0 to optimize the activity of the enzymes used in performing targeted hydrolysis of cell wall components. The pH may be adjusted by adding at least one acid and/or buffer selected from the group consisting of phosphoric acid, hydrochloric acid, sulfuric acid, phosphate buffers, acetate buffers, and combinations thereof. In a preferred embodiment the acid is phosphoric acid.

In order to obtain an optimal exposure of the biomass components to the enzymes, agitation is preferably applied and may be selected from the group consisting of stirring and/or compressed air or gas bubbling agitation and/or vessel-shaking. Applicable stirrers may be selected from the group consisting of anchor stirrers, blade stirrers, K-stirrers, paddle stirrers or any combinations thereof.

In a preferred embodiment the hydrolysis under agitation is performed for 0.5-5.0 hours such as in the range of 0.5-4.0 hours, e.g. in the range of 0.5-3.0 hours, e.g. in the range of 1.0-2.5 hours, e.g. in the range of 1.0-2.0 hours, e.g. preferably in the range of 1.0-1.5 hours, preferably for 1.5 hours.

The dry mechanically and enzymatically treated material may be subjected to a wet mechanical treatment. The wet mechanical treatment may be simultaneous with the enzyme treatment, periodically/intermittently during the enzymatic treatment, or a subsequent mechanical treatment. In an embodiment of the invention, the wet mechanical treatment is selected from the group consisting of conical refiners, disc type refiners, atmospheric refiners, pressurized refiners and combinations thereof; or wet milling such as toothed colloid mill. Such wet refining or milling may be repeated as many times as desired: 1, 2, 3 or 4 repetitions will normally suffice. Alternatively, or additionally, very powerful stirring may be applied.

In a preferred embodiment of the present invention, the disassociation of cuticular wax from plant material in step (b) for obtaining a sample comprising plant derived curricular wax and dewaxed plant material is carried out by a method comprising the step of:

(i) subjecting the plant material to a dry mechanical treatment,
(ii) optionally fractionating the material obtained in step (i) by size,
(iii) suspending the material obtained in step (i) or a selected fraction obtained in step (ii) in an aqueous liquid comprising one or more protease and/or pectinase enzymes, (iv) optionally subjecting the mixture obtained in step (iii) to wet mechanical treatment, According to step (c) of the method of the present invention, the temperature of the aqueous sample obtained in step (b) is increased to solubilize the plant derived wax. The temperature is increased in order to melt and liquefy the wax, such that the dewaxed plant material and other solids can be separated from a liquid part comprising water, water-soluble plant material and the melted waxes. The wax may be fully or partly liquefied dependent on the composition of the wax and the temperature.

Table 2 provides the melting temperature of a wide variety of waxes. In a preferred embodiment of the invention, the temperature is increased to a temperature greater than the melting point of the plant derived wax in question based on its origin as specified by table 2.

TABLE 2

Melting temperature of waxes

| Type of wax | Source | Melting point (° C.) |
|---|---|---|
| Animal and insect wax | | |
| Bees wax | Bees | 62-64 |
| Lanolin | Sheep/wool | 36-42 |
| Spermaceti | Sperm whale skull | 42-50 |
| Plant waxes | | |
| Candellila | Euphorbia cerifera | 68-72 |
| Carnauba | Copenicia cerifolia | 82-86 |
| Castor | Hydrogenated oil from Ricinus communis | 82 |
| Cotton Stearin | Cotton Seed | 68-71 |
| Jojoba | Hydrogenated oil Simmondsia californica | 60-70 |
| Ouricury | Syagrus coronata (palm) | 81-84 |
| Palm oil wax | Vegetable oil byproduct | 52-60 |
| Rape seed wax | Vegetable oil byproduct | 36-39 |
| Rice bran wax | Rice bran oil byproduct | 77-86 |
| Soy | Vegetable oil byproduct | 56-60 |
| Wheat straw wax | | ≈64 |
| Barley straw wax | | ≈65 |
| Oat straw wax | | ≈64 |
| Mineral/fossil waxes | | |
| Montan | Lignite/Coal | 84-90 |
| Petrolatum | Paraffin | 63 |
| Microcrystalline Slack wax | Paraffin | 49 |
| Microcrystalline Petrolatum | Paraffin | 58 |
| Synthetic | | |
| Polyethylene wax | Ethylene | various |
| Fischer Tropsch | Straight chain hydrocarbons from syngas | various |
| Synthetic Ester waxes | Fatty acid + fatty alcohol synthesis | various |

In one embodiment, the temperature of the suspension obtained in step (b) is increased to 60-90° C., such as in the range from 65-90° C., e.g. in the range from 67-85° C., such as in the range from 75-85° C. and preferably to 80° C. In one embodiment, the temperature of the sample obtained in step (b) is increased to above 70° C., preferably above 80, 90 or 95° C.

The temperature may be increased by any standard means of raising the temperature of an aqueous solution.

In a preferred embodiment, the temperature of the aqueous sample obtained in step (b) is adjusted by heat exchange, hot water injection, or steam injection, or even a combination thereof.

According to step (d) of the method of the present invention, the suspension obtained in step (c) is separated into a solid fraction and liquid fraction comprising melted plant derived wax.

In principle, any known method and device which can be applied to separate a solid fraction from an aqueous suspension may be applied. In one embodiment, the separation in step (d) is performed by a method selected from the group consisting of decanting, centrifugation, and filtration. In another embodiment, removal of the solid dewaxed plant material from the aqueous composition is carried out using a mechanical device selected from the group comprising a centrifuge, a decanter, a filter, a press, or an extruder.

In one embodiment, separation is performed using a centrifuge decanter, yielding a liquid top-phase comprising dissolved solids, including plant derived wax in the form of molten suspension and emulsion droplets, and a fibrous phase comprising residual insoluble dewaxed plant component. In another embodiment, separation may be performed by any form of sieving/filtration, using any molecular size as desired and the filtration device may be selected from small mesh filter, pressurized filter, belt filter, filter press and combinations thereof, similarly resulting in a fibrous dewaxed product and a liquid comprising the plant derived wax.

In one embodiment, the temperature maintained during separation in step (d) is in the range 65-95° C., such as in the range from 65-90° C., e.g. in the range from 75-85° C., such as in the range from 80-85° C. and preferably 80° C. In one embodiment, the temperature maintained during separation in step (d) is greater than 70° C., preferably above 80, 90 or 95° C.

The solid fraction comprising fibrous, dewaxed plant material obtained after separation in step (d) has a dry matter content greater than 13%, preferably greater than 23%, even more preferable greater than 33%, most preferably greater than 40%. Additional water may be removed from this fibrous, dewaxed material, such as by using thermal or vacuum drying to increase the dry matter content. The fibrous, dewaxed material may be used as a biofuel. The fibrous, dewaxed plant material may be pelleted or treated in other ways to facilitate easy handling of the material. Or it may be partly of fully suspended in an aqueous solution as a result of a previous treatment, such as the above described.

The liquid fraction comprising plant derived wax is further refined as described in the following steps below.

According to step (e) of the method of the present invention, the pH and the temperature of the liquid fraction from step (d) is adjusted to pH 5.5 or lower and 50° C. or lower, respectively.

Upstream processing steps using enzymes for dewaxing of the plant material may preferably be performed at a pH around 5 to 5.5, while separation of the wax from the dewaxed plant material may preferably be done at temperature greater than 65° C. It was unexpectedly found that decreasing the pH and temperature lead to the development of a fine precipitate as a visible clouding in the liquid. It was surprisingly found that at least 95% of the wax present in the liquid binds within these precipitated particles. Without wishing to be bound by theory, it is believed that the wax emulsion was stabilized in the water phase of the previous processing steps by the free fatty acids being dispersed in the liquid (especially the C14, C16, C18 fatty acids) as soaps at the process conditions of pH>5. By lowering the pH, the free fatty acids are regenerated from the soaps (i.e. salts of the fatty acids) and the emulsion destabilizes, leading to the hydrophobic waxes binding to the particulates in the aqueous phase and precipitate down, rather than floating up as would otherwise have been expected. Hence, the waxy components stick to particulates such as plant fines, silica particles, proteins, and lignin present in the liquid phase. This precipitate is referred to as the waxy fraction.

Most of the fatty acid components in the waxy mixture have pKa values in the range 4.7-5.3 (weak acids), see table 3. A person skilled in the art would recognize that at the pH equivalent to the pKa for each acid in such an aqueous system, the concentration of carboxylate anions generated will be equivalent to that of the free fatty acid chains. At pH values lower than pKa, the proportion of free fatty acid to carboxylate anion will increase, and vice versa at pH values greater than the pKa. Long chain carboxylate anions act as effective soaps or ionic surfactants, and will help stabilize emulsions of non-polar components in water. Hence, the greater the proportion ionized, the more stable the suspension/dispersion of waxy components will be.

TABLE 3

Properties of long chain carboxylic acids present in pant waxes

| Acid | pKa | Solubility of free fatty acids in water* |
|---|---|---|
| Lauric ($C_{12}$ saturated) | 5.3 | 72 mg/L at 45° C. |
| | | 63 mg/L at 30° C. |
| Myristic ($C_{14}$ saturated) | 4.9 | 33 mg/L at 60° C. |
| | | 24 mg/L at 30° C. |
| Palmitic ($C_{16}$ saturated) | 4.75 | 1.2 mg/L at 60° C. |
| | | 0.83 mg/L at 30° C. |
| Stearic ($C_{18}$ saturated) | 4.8-4.9 | 1 mg/L at 60° C. |
| | | 0.6 mg/L at 25° C. |
| Oleic ($C_{18}$ mono-unsaturated) | 5.02 | Insoluble |

*Sidell et al (1940) Solubilities of inorganic and organic compounds (3rd ed), New York, D.Van Nostrand company, pp 762-763.

In one embodiment, the pH is in step (e) adjusted to below the pKa value of the C12, C14, C16, and/or C18 fatty acids present in the waxy mixture, such as preferably adjusted to 1 pH unit below the pKa value of the fatty acids. This is preferred in order to regenerate the free fatty acids from their soaps as discussed above. Hence, according to Table 3, the wax precipitate/clouding described above will not occur at neutral pH, as the pKa of the relevant fatty acids lie below neutral pH.

Therefore—to ensure precipitation—in one embodiment, the pH is in step (e) lowered to below 5.5, such as below 5.4, 5.3, 5.2, 5.1, 5.0, 4.9, 4.8, 4.7, or 4.6; preferably below 4.5, 4.4, 4.3, 4.2, 4.1, 4.0, 3.9, 3.8, 3.7, 3.6, 3.5, or even lower. In a preferred embodiment, the pH is lowered to between 3.5 and 4.4, such as pH 3.6-4.2, most preferred lowered to pH 3.8-4.0. From a practical point of view it is undesirable to use very corrosive conditions as this will make standard steel vessels deteriorate over time.

The pH adjustment of the liquid may be performed by adding an acid selected from the group consisting of orthophosphoric acid, sulfuric acid, acetic acid, or others acids and combinations thereof.

As the pH of the aqueous dispersion is adjusted in step (e), such as adjusted to below the pKa value of the fatty acids, most of the fatty acid components that are in anion/carboxylate form become re-protonated, and as the pH approaches 1 unit below the pKa for each fatty acid present in the waxy mixture, over 90% will be in the free acid form, less than 10% ionized, and overall capacity to stabilize emulsion is significantly reduced. In addition, the solubility of the long chain free fatty acids, e.g. palmitic, stearic and oleic acid, in water is very low, as opposed to their more soluble carboxylate anions.

The precipitate described above is preferably formed at a temperature below the melting point of the wax, such as below 65° C. In one embodiment, the temperature of the liquid phase is in step (e) adjusted to less than 65° C., such as 60, 58, 56, 54, 52, 50, 48, 46, 44, 42, or even 40° C. or less. In one embodiment, the temperature during step (e) is in the range 15-80° C., such as preferably in the range from 15-65° C., e.g. in the range from 20-60° C., such as in the range from 20-50° C., e.g. in the range 30-45° C., and preferably in the range 30-40° C.

As the temperature decreases, the solubility of the long chain fatty acid components in water reduces, and waxy components solidify.

In one embodiment, the pH adjustment of the liquid fraction in step (e) is performed before the temperature adjustment. In another embodiment, the temperature adjustment of the liquid fraction in step (e) is performed before the pH adjustment.

In a preferred embodiment, the pH is in step (e) adjusted to less than pH 4.5 and the temperature is adjusted to within the range 30-40° C.

According to step (f) of the method of the present invention, the mixture obtained in step (e) is separated into a waxy faction and an aqueous fraction.

The wax rich particles formed in step (e) (which include silica fines, protein/peptide) have a density higher than that of water and therefore can be separated by settlement and decantation, filtration, or by direct centrifugation as the heavy, insoluble phase (clarifying centrifuge).

In one embodiment, the separation in step (f) is performed by any method to separate a cloudy precipitate from a liquid, such as centrifugation. Filtration is also possible, but the particles are very fine and it will therefore take a long time . . . so we prefer centrifugation. In a preferred embodiment, the separation in step (f) is performed by centrifugation; the waxy fraction (bottom-phase) is thereby separated from the aqueous fraction (water). This may be done in a single centrifugation step or done in 2, 3, 4 or even more sequential centrifugations.

According to step (g) of the method of the present inventions, the plant derived cuticular wax is recovered from the waxy fraction obtained in step (f).

Pure cuticular wax may be recovered by removing preferably all other components of the waxy faction, such as remaining water, fines, silica, proteins, lignin and other solids from the wax, as described below.

In one embodiment, water may be removed from the waxy fraction by further treatment, such as evaporation, distillation, membrane separation or a combination hereof. As an example, a warm-air fan oven (such as a belt type/tunnel oven or other drier) or a flash drier (including for example ring type flash drier known to those drying glutens and other proteins) may be used to dry the wax at a temperature that results in the temperature of the waxy material does not exceed 80 C. In a preferred embodiment, the waxy fraction is dried to a DM content >95%. The dried waxy fraction may optionally be milled or crushed to a powder.

Any separated aqueous fraction may be recycled and reused, such as e.g. heat exchanged with the sample provided in step (b) to increase the temperature as specified in step (c).

In a further embodiment, any solid particles (such as fines, silica, protein, and lignin) may be removed from the crude wax using a suitable solvent for the wax followed by separation of the solids from the liquid phase now comprising the wax. In such one embodiment, the plant derived cuticular wax from said waxy fraction from step (f) is recovered by solvent extraction. The solvent may be any solvent for wax, such as a non-water miscible liquid. In a preferred embodiment, the solvent is a C1-C4 alcohol, such as selected from the group consisting of methanol, ethanol, propanol, iso-propanol, butanol, iso-butanol, tert-butanol or a combination hereof. In a most preferred embodiment, ethanol is used as solvent. The crude wax is dissolved in hot/boiling solvent, selected from the above list, preferably ethanol. Hence, in a preferred embodiment, the dried waxy phase is recovered as a powder after the evaporation as described above and mixed with an excess of hot ethanol (at least 96% w/v, preferably 99%) during the final cleanup phase. In one embodiment, the temperature of the solvent is above 40° C., such as between 50-80° C., such as preferably between 65-75° C. The temperature is preferably selected such that all components in the crude wax will dissolve/disperse in the hot solvent. The solids are then separated from the liquid by any standard means of separating a solid phase from a liquid phase, such as by filtration. Therefore, in one embodiment, the solution is filtered to remove solid particles, e.g. by use of an in-line filter or a separate filter, such as in the form of sock, flat bed, belt or band filter onto which the suspension is pumped or poured. Filtration comprises a porous layer or perforated layer, cloth, or a combination hereof, with or without filter-aid. Filter-aid is selected from the group of kiselguhr, diatomeceous earth, carbon, activated carbon, montmorillonite, bentonite, Fuller's earth, clay minerals, cellulose, and perlite. Preferably, a filter band comprising a porous cloth of regenerated cellulose/viscose filter material, or polypropylene filter material, is used.

The solution is then cooled to a temperature which leads to the precipitation of the waxy components. In one embodiment, the temperature of the solution is lowered to less than 30° C., such as lowered to between 2-25° C., such as preferably lowed to between 10-20° C.

In a preferred embodiment, the plant derived cuticular wax from said waxy fraction from step (f) is recovered by (I) mixing the waxy fraction from step (f) with hot alcohol to dissolve the wax, (II) separating the hot suspension from step (I) into a solid fraction and a liquid fraction, (III) cooling the liquid fraction from step (II) to a temperature which leads to the precipitation of the wax, wherein the temperature of said hot alcohol is above 40 C; and alcohol is a C1-C4 alcohol, such as selected from methanol, ethanol, propanol, iso-propanol, butanol, iso-butanol, tert-butanol, or a combination hereof.

The wax precipitate is recovered, e.g. by filtration or other means of separating an insoluble faction from a liquid. This can be an in-line filter or a separate filter, such as in the form of sock, flat bed, belt or band filter onto which the suspension is pumped or poured. Filtration comprises a porous layer or perforated layer, cloth, or a combination hereof, with or without filter-aid. Filter-aid is selected from the group of kiselguhr, diatomeceous earth, carbon, activated carbon, montmorillonite, bentonite, Fuller's earth, clay minerals, cellulose, and perlite. Preferably, a filter band comprising a porous cloth of regenerated cellulose/viscose filter material, or polypropylene filter material, is used.

Finally, the recovered precipitate may optionally be washed with more cold solvent.

The solvent may be recovered from the eluent and recycled.

In a further embodiment, residual solvent is removed from the cleaned wax by evaporation, such as removed by blowing warm air/stream at the wax, effectively evaporating the solvent; or removed by melting the wax at a temperature which allows the solvent to evaporate, such as a temperature above 75° C., preferably at a temperature in the range 75-100° C., more preferably in the range 80-90° C.

According to step (h) of the method of the present invention the cuticular wax recovered in step (g) may be bleached. Bleaching is preferably achieved by exposure to a bleaching agent. In one embodiment, the bleaching agent is selected from the group consisting of oxidants such as chlorine, hypochlorite, chloramine, chlorine gas, chlorine dioxide, sodium percarbonate, sodium perborate, molecular oxygen, ozone, peroxoacetic acid, benzoylperoxide, and bromate. In a preferred embodiment, the wax is bleached using ozone.

Ozone treatment as a means of bleaching is not limited to cuticular plant waxes treated according to steps (a)-(g) of the present invention, but may be applied to any wax product. Any wax composition may preferably be bleached using ozone as illustrated below.

Using ozone as bleaching agent, wax is preferably melted in a hot aqueous solution, such as at temperatures above the melting temperature of wax selected from table 1. In one embodiment, the wax is melted in an aqueous solution having a temperature in the range 65-95° C., such as in the range 65-90° C., e.g. in the range 75-85° C., such as in the range 80-85° C., and preferably at 85° C. In one embodiment, the temperature is above 70° C., preferably above 80, 85, 90 or 95° C.

In one embodiment, wax is dispersed in the aqueous solution using emulsion technology: pH is increased, which effects soap formation of residual fatty acids in the wax, facilitating emulsion formation. In one embodiment, pH is increased above pH 9, such as increased to pH in the range 9-11, e.g. in the range 10-11.

The pH adjustment of the solution may be performed by adding a base selected from the group consisting of sodium hydroxide, potassium hydroxide, calcium hydroxide, ammonium hydroxide, sodium carbonate and combinations thereof.

In a preferred embodiment wax is dispersed in an aqueous solution at a temperature of 75-90° C. and pH 10-11. Stirring may be applied for optimal dispersion of the wax. Applicable stirrers may be selected from the group consisting of anchor stirrers, (multi-)blade stirrers, K-stirrers, paddle stirrers or any combinations thereof.

Ozone (O3) is introduced to the dispersed wax, such as by bubbling through the solution. In one embodiment, ozone is bubbled though the dispersed wax for 1, 2, 3, 4, 5 hours, or even up to 6 hours, The dosage rate of ozone is circa 20 g-400 g per hour output from the ozone generator.

In a preferred embodiment, ozone is bubbled though the dispersed wax for 1-4 hours at a dosage rate of 10-20 g per hour, maintaining the temperature at 80-90° C., and stirring throughout.

Following the ozone treatment, pH is lowered to regenerate the fatty acids from their salts (soaps) and hence help break remaining emulsion. In one embodiment, pH is lowered to a value below pH 5, such as lowered to the range of pH 3-5, even lowered to a pH value between pH 3.5-4. The pH adjustment of the solution may be performed by adding an acid selected from the group consisting of phosphoric acid, hydrochloric acid, sulfuric acid, acetic acid. At low pH, the bleached wax rises to the top as a separate layer. The mix is preferably allowed to cool to ambient temperature and the wax may be recovered as a solid.

According to step (i) of the method of the present invention, the recovered (and optionally bleached) cuticular wax may be formulated into highly valuable products, such as in one embodiment formulated into cosmetics, medical additives, and personal care products; in another embodiment formulated into food ingredient, food coating, or even rodent bait; in yet another embodiment formulated into other surface coatings, e.g. fertilizer coating; in yet another embodiment formulated into lubricants, molding, polishes, leather tanning, textile waterproofing, technical moisture barrier, garments; in yet another embodiment formulated into adhesive, inks, paints, crayons, pencils; in yet another embodiment formulated into barbeque fire starter, matches, candle lights. In a preferred embodiment, the wax product is formulated into a cosmetics or other personal care product. Formulation may comprise process steps selected from the group consisting of granulation, flaking, pearling, extruding, milling, and fusing.

II. Methods of Analyzing Products Obtainable by the Present Invention

II.i Total Wax Content

The total wax content of cereal straw can be determined gravimetrically as total lipids. Dried wax-containing cereal straw is milled and then extracted with hot/boiling chloroform. This is performed by either of two basic methods, where method 2 is preferred over method 1 if the bulk density of the plant material is high.

1. An accurately weighed portion of milled biomass (oven dry) is placed in a soxhlet thimble and then subjected to 12 hour extraction in a soxhlet extraction system, using the standard soxhlet methodology. After extraction, the thimble and remaining solid material are dried at 103° C., and the extracted wax is determined by mass difference compared to the start material. Or,
2. A portion of (accurately weighed) approximately 30 g of dried, milled straw or other plant material, is placed into a 2 L round bottomed flask and to this is added 1 Liter of chloroform. The flask is fitted with a reflux condenser and the material is refluxed in Chloroform for a minimum of 3 hours. After this time, the remaining solids are collected quantitatively, then dried (103° C.) and weighed. The wax content is determined via the mass difference with respect to the input material.

II.ii Wax Composition

Figure 2:
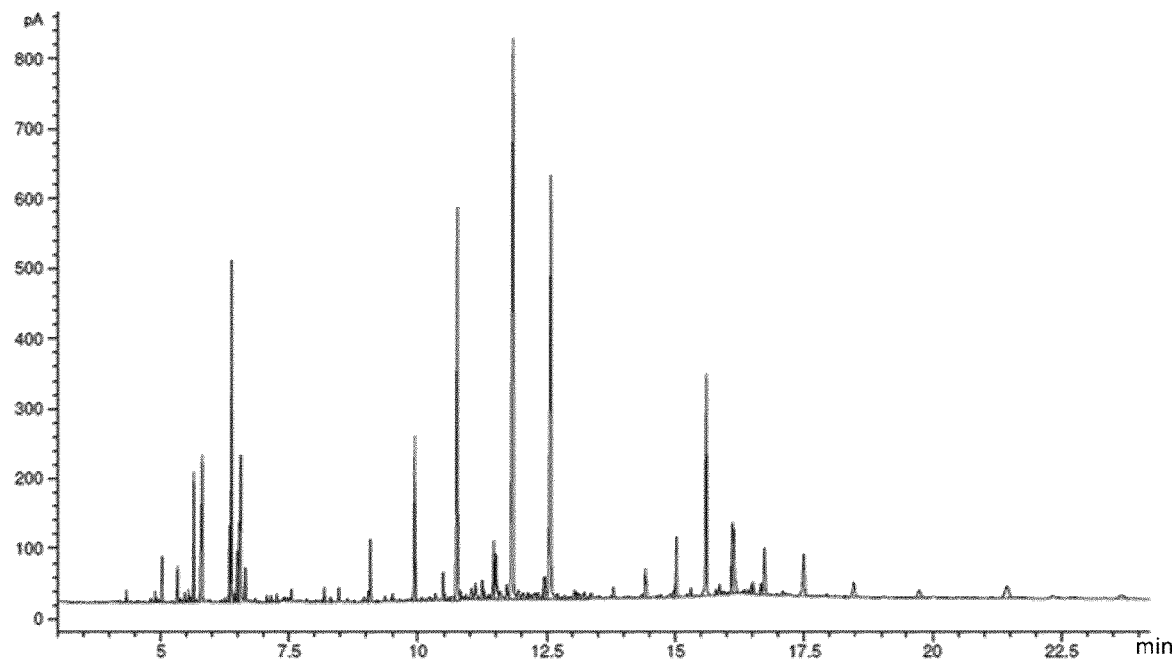
FIG. 2: a GC chromatogram of chloroform extracted wheat straw from Denmark; peaks before 7.5 mins are fatty acids (mainly C16 and C18), peaks at 9.5-12.5 mins are mainly alkanes, aldehydes, and fatty alcohol, peaks from 14-17.5 mins are mainly sterols, and beta-diketone, while peaks after 18 mins are waxy esters.

Wax composition is determined and monitored by Gas Chromatographic analysis ("GC"). Wax samples are dissolved in Chloroform (circa 0.1 and 0.2 g waxy solids per 25 g Chloroform) and analyzed using Gas Chromatography (GC) on an Agilent GC5890 system equipped with a Gerstel CIS4 inlet controlled by a C505 controller. Samples (25 microlitre) introduced, using an ALS 7683 autosampler, onto a 15 metre long J&W 123-5711E DB-5HT (with 5% methyl silicone). The temperature ramp is ambient to max 350 C, with FID detection (375 C). FIG. 2 shows a GC trace of chloroform extracted wheat straw wax (12 hour, Soxhlet method; 10 parts solvent to 1 part straw), which in this application is used as "standard wax" for reference in regards to purity. Peaks before 7.5 mins are fatty acids (mainly C16 and C18), peaks from 9.5-12.5 mins are mainly alkanes, aldehydes, and fatty alcohol, peaks from 14-17.5 mins are mainly sterols, beta-diketone, while those peaks after 18 mins are waxy esters.

II.iii Wax Purity

Purity of the wax product is determined by standard Soxhlet chloroform extraction method: 5 g of wax is placed in a pre-weighed extraction thimble and extract with Chloroform (250 mls reservoir) continuously for 12 hours (soxhlet procedure), then the thimble is dried and weighed for determining residual, non-waxy components. Results are then evaluated in combined with the GC results, as described above (which allows estimate of residual methyl ester content), to get a gauge on purity.

II.iv Wax Color

Wax color may be described according to the Gardner scale index. The Gardener color is determined by comparison of a test sample to a standard reference color, such as determined by the Lico Spectral Colorimeter (by Hach), e.g. Lico 690: The wax sample is melted and poured into a disposable 11 mm round cuvette to a depth of 2 cm. The outside glass of the cuvette should be wiped clean and it is important to ensure there are no air bubbles. The wax containing cuvette is then inserted into the cuvette compartment and the instrument performs a color measurement ranging from 0 to 18 accurate to one decimal place.

II.v Wax Melting Point

Wax melting point may be measured by differential scanning calorimeter (DSC) measurement.

III. Products Obtainable by the Present Invention

The invention provides a refined plant derived wax product. The wax product comprises only a low amount residual solvent, such as less than 5%, 4%, 3%, 2%, preferably even less than 1%.

The texture of the dried wax product is hard and brittle the touch rather than soft and tacky.

The melting point (drop point) of the wax product is greater than 50° C., such as greater than 52, 54, 56, 58, or 60° C., depending the source of the wax Preferably, the melting point is between 60-70° C., such as preferably 65-68° C. for wheat straw wax.

For cereal straw waxes, the wax product preferably comprises less than 1% solvent and has a melting point between 65 and 68° C.

The wax product may optional be bleached, obtaining a bleached wax having a Gardner color values of less than 18, such as a Garner color between 8-18, preferably between 8-10, such as even lower than 8 for cereal straw waxes.

IV. Potential Use of Products Obtainable by the Present Invention

The present invention provides a highly valuable plant wax product. In one embodiment, the wax product may be used as natural and "green" alternatives to waxes coming from the petrochemical industry. In a further preferred embodiment, the wax product can be substituted for the mineral oil-based waxes in numerous uses, including in cosmetics, medical additives, personal care products, food coating, food ingredient, lubricants, polishes, molding, adhesive, surface coatings, fertilizer coating, textile waterproofing, technical moisture barrier, leather tanning, inks, paints, garments, crayons, pencil, barbeque fire starter, candle lights, matches, rodent bait. In a preferred embodiment, waxes of the present invention—such as cereal straw waxes—are used in cosmetics.

EXAMPLES

Example 1: Refining of Wheat Straw Wax 1.1 Dewaxing of Wheat Straw

After harvest of wheat grains from a wheat field in Vestsjælland, Denmark, the remaining wheat straw was collected and transported to the treatment plant where it was treated in a hammer mill and subsequently sieved using an 8 mm sieve. The fraction passing the sieve was then processed in a dust separator for removal of fines material (15-20% of the straw mass was removed as fines material).

The straw fines were suspended in 55° C. water, in a jacketed steel tank, at a loading of 87 kilograms straw (corresponding to circa 79 kgs straw dry matter) per 1400 liters of water. pH of the resultant slurry was adjusted to pH 5.4 using phosphoric acid and the temperature maintained at circa 55° C. The slurry was stirred using a Myers type dispersion mixer, to ensure good dispersion. 200 ml protease rich preparation (Promod 24 L (110 casein units/ml), Bio-Catalysts Ltd, UK) and 100 ml pectinase rich enzyme preparation (Pectinase 974 L (900 units/ml), BioCatalysts Ltd, UK) were added to disrupt the straw cuticle and help release wax. The slurry was circulated through a Fryma type wet-mill (fitted with a toothed colloid milling head) with a wide mill (>2 mm) head gap, meaning that the mill is acting as an effective pump mixer, rather than a true grinding mill, helping to ensure access of the enzymes to the straw cuticular surface. The wet-milling and stirring was applied during enzymatic treatment while maintaining pH and temperature profile as specified above. After about 1 hour, the temperature of the slurry was raised to 80° C. to ensure all waxy components are in a molten state and to inactivate the enzymes; and the mixture was further stirred for about 10 minutes. This process slurry comprises molten wax together with water and water-soluble components and insoluble, solid, dewaxed material. This dewaxing process was performed 3 times, reusing the process liquid each time to increase wax concentration in aqueous phase. A total of 6.8 kg wax was found to have been released into the water phase during the process (determined by standard chloroform Soxhlet extraction method).

1.2 Refining of Wax from Wheat Straw by pH and Temperature Adjustment, EtOH Extraction and Wash Wax is initially released from straw as described above on example 1.1. After the third cycle (i.e. after processing of 3×79 kgs straw fines), the process slurry (1250 litres) was decanted in a decanter centrifuge to separate fibers (solid phase) from the liquid phase comprising wax. The Liquid phase from the decanter (decanter top layer; 1200 litres) was pumped to a 2000 litre stainless steel tank fitted with a mechanical stirrer, and the pH of the liquid was lowered from circa 5.3 to 3.9 using phosphoric acid. The liquid was allowed to cool from circa 80° C. down to 30° C. A visible "clouding" was noted, indicating precipitation of a proportion of the dry matter. The pH adjusted liquid was processed in a clarifying centrifuge (separator type: GEA SB-7-06-076, feed rate 600 litres per hour, feed temp 30 C) in which the bottom phase (precipitate) was collected as a paste at 15% dry matter content. A total of 120 litres of bottom phase "paste" was produced. This paste comprises wax, plant fines, silica particles, some hemicellulosic and pectic components, proteins/peptides, and lignin. The paste was collected and a 12 kg portion was dried using a warm-air fan oven at 110° C. for 6 hours, then manually milled/crushed to a powder. This yielded 1750 g of a dry, friable and brittle grey colored material. The dried solid powder was then added to hot ethanol (temp at 73° C., 6 parts EtOH to 1 part powder), whereby the wax part melted and dispersed and dissolved in the hot ethanol. The mix was stirred and then filtered at this temperature, using a cellulose/paper filter on a wire mesh in an enclosed vessel, maintaining temperature during filtration, thereby separating the wax (dissolved/dispersed in the hot-ethanol) from the insoluble, non-waxy components. The liquid filtrate was then cooled to 10° C. whereby the wax was observed to crystallise/precipitate out. The cooled sample was then cold filtered using a cellulose filter paper held in a wire mesh basket (gravity filtration, no pressure or vacuum), the wax this time being the solid "filtrant", which was then washed with 2 further volumes of cold ethanol (15° C.), and then dried in a 90° C. oven. This yielded 698 g of cleaned wax.

1.3 Analysis of Wax Products

A portion (200 g) of the bottom phase "paste" recovered from the clarifying centrifuge as described in example 1.2, as well as a portion (1 liter) of the clarified aqueous top phase, were analyzed to determine wax content and wax composition:

The 200 g thick bottom phase "paste" material was dried in a 90° C. oven overnight, generating a brittle, friable solid, which was milled to a coarse powder. A 10 g portion of this was then extracted for 1 hour using chloroform (200 mls) via reflux in a round bottomed flask fitted with a reflux condenser. The residual powder was filtered off using a regular filter paper and funnel, after which the chloroform filtrate was quantitatively evaporated under vacuum (rotary evaporator), leaving a wax deposit which was then weighed. This yielded 4.45 g of wax, indicating that the dry matter in the centrifuge bottom phase contains 45% wax by mass.

The 1 liter top phase was evaporated down to 100 g, then dried overnight in an oven. This yielded 33.2 g dry matter, suggesting a DM content of 3.3% for this phase. This dry mass was extracted using chloroform (10 g, extracted for 1 hour via reflux, as above). Less than 0.05 g resulted from the extract, indicating a very low or negligible wax content in this phase.

Figure 3:
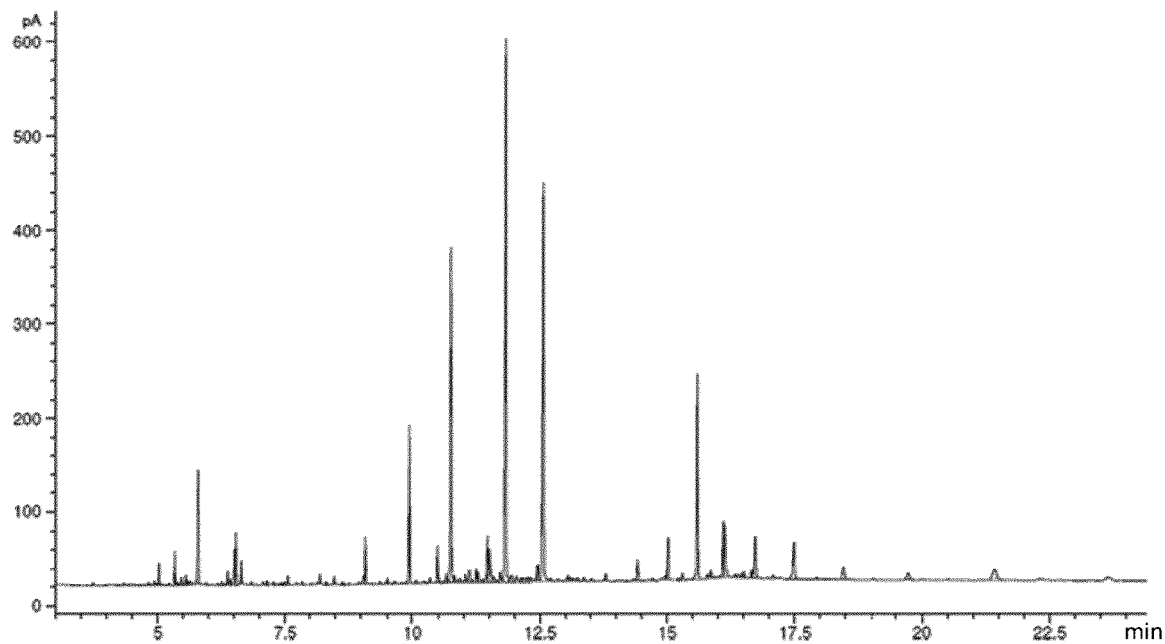
FIG. 3: a GC chromatogram of chloroform extract of the clarifying centrifuge bottom layer "paste" prepared in example 1.2.
Figure 4:
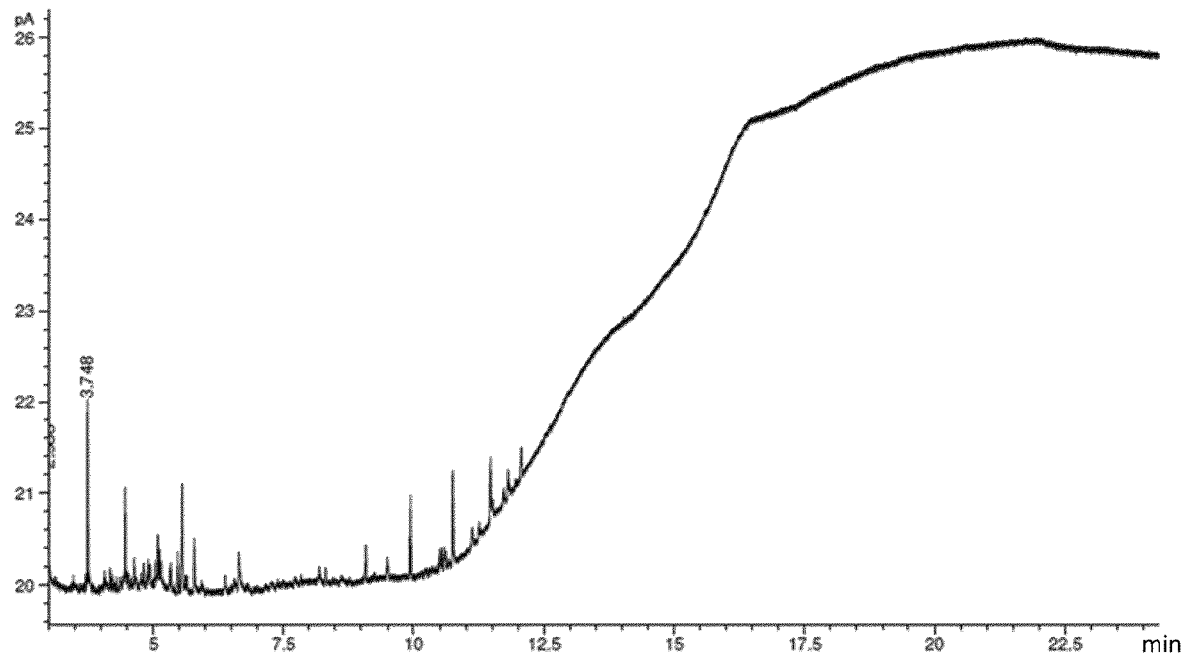
FIG. 4: a GC chromatogram of chloroform extract of the clarifying centrifuge top phase residue prepared in example 1.2.

The two solid residues obtained from the chloroform extraction were analyzed using the GC system as described in section II.ii of this application. This clearly showed that the extract from the bottom layer "paste" is wax (FIG. 3), while wax is absent in the top phase residue (FIG. 4).

Figure 5:
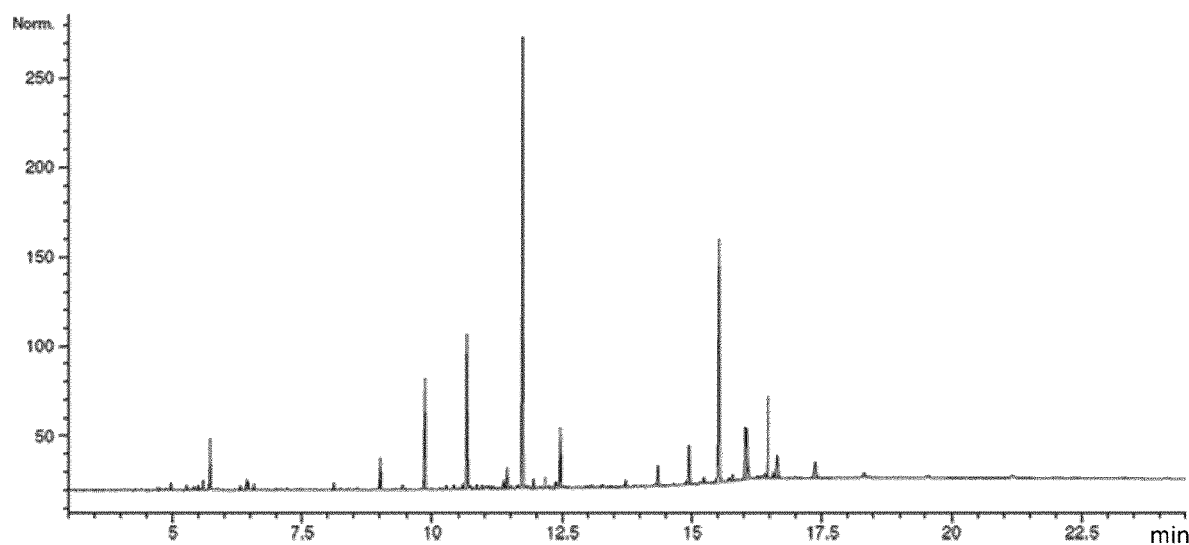
FIG. 5: a GC chromatogram of the final wax product (after ethanol extraction and cleaning) in example 1.2.

The final wax product obtained in example 1.2 (after ethanol processing of the dried bottom layer paste material) was analyzed: The wax was hard and brittle to the touch at room temperature. The cleaned wax contained less than 1% of residual solvent. Standard chloroform Soxhlet extraction method combined with the GC data (FIG. 5) showed that the wax product was at least 95% pure. Differential scanning calorimeter (DSC) measurement showed a peak melting point for the wax at 65° C.

Figure 6:
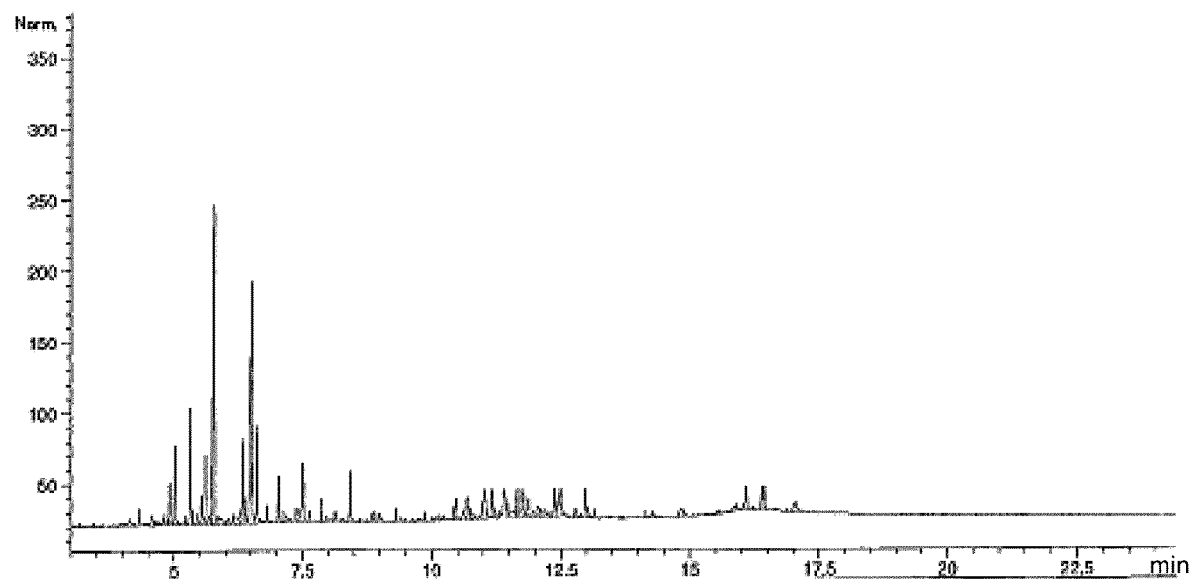
FIG. 6: a GC chromatogram of the ethanol wash liquid (used in cleaning of the wax) in example 1.2.

Further, GC analysis of the ethanol showed that a portion of the free fatty acid components (from the wax) were present in the ethanol (FIG. 6).

Example 2: Effect of pH and Temperature Adjustment During Wax Refining

Wax is initially released from straw as described above on example 1.1. After the third cycle (i.e. after processing of 3×79 kgs straw fines), the process slurry (1250 litres) was decanted in a decanter centrifuge to separate fibers (solid phase) from the liquid phase comprising wax. The liquid phase from the decanter (decanter top layer; 1200 litres) was pumped to a 2000 litre stainless steel tank fitted with a mechanical stirrer—the pH of the liquid phase was at this point pH 5.3 and the temperature 80° C. This liquid phase was adjusted to different temperatures and pH(s) as described below to observe the influence of temperature and pH on the formation of a wax precipitate.

As described previously, lowering of the temperature reduces overall solubility of the fatty acid components in water, and lowering of the pH has the effect of decreasing the amount of fatty acids present in anionic form, as soaps: as they become "free fatty acids", their water solubility drops dramatically. Lowering pH further increase the likelihood of residual protein and peptide precipitation.

2.1 Effect of pH

In a first experiment, the temperature of a 1 liter portion of the liquid was dropped down from 80° C. to 30° C. A slow precipitate formation (clouding) was hereby observed. The pH of the liquid was then in a first step lowered from circa 5.3 to 5.2, then in a second step further lowered down to pH 3.4 in steps of 0.2 pH units, using phosphoric acid. It was visually observed that as the pH is lowered, the rate of precipitation/flocculation accelerated.

Figure 7:
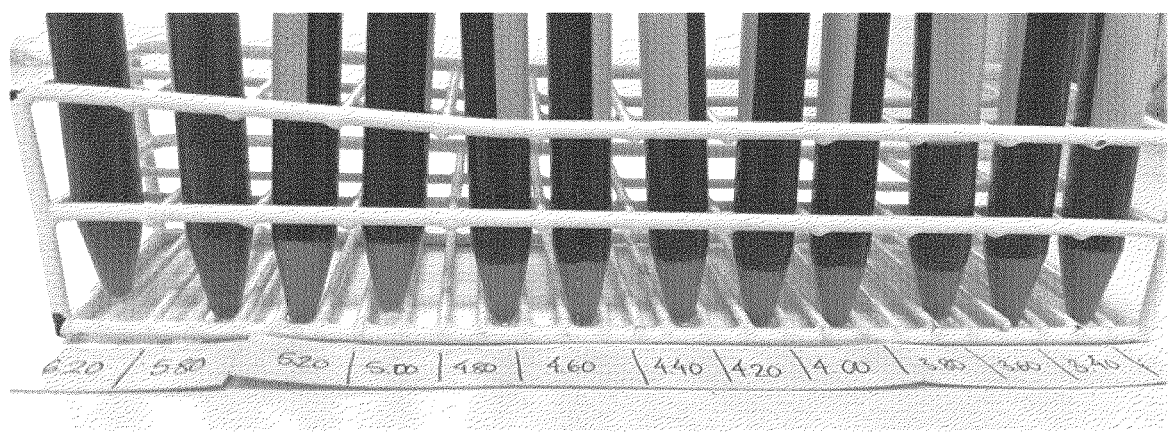
FIG. 7: picture of the sample tubes tested for the effect of different pH adjustments: pH 6.2, 5.8, 5.2, 5.0, 4.8, 4.6, 4.4, 4.2, 4.0, 3.8, 3.6, and 3.4 (from left to right), after centrifugation as described in example 3.1.

In a second experiment, the temperature of a 1 liter portion of the liquid was dropped down from 80° C. to 30° C. as described above. The sample was then aliquoted out (100 ml aliquots) in order analyze the precipitate product from a range of different pH adjustments: pH 6.2, 5.8, 5.2, 5.0, 4.8, 4.6, 4.4, 4.2, 4.0, 3.8, 3.6, and 3.4. The pH adjusted samples were left over night and then centrifuged in a bench top centrifuge (see FIG. 7). No significant precipitate was found at pH 6.2 and pH 5.8, while surprisingly at pH 5.2 and lower, a significant pellet was formed, as see in picture (FIG. 7). Hence, pH needs to be below neutral for the precipitate to form. The liquid was removed (poured off and precipitate dried), and the mass of the pellet wax products were measured. The mass of the pellets were found to be pretty consistent for all the different samples at pH 5.2 and lower. Meanwhile, the volume of the pellet decreased significantly with lowering of the pH, especially from pH 4.8 and below, showing that the density of the precipitate increased as the pH is lowered, down to a pH value of 3.8, where after the density again decreased. From a process point of view, an increased particulate/flocculated mass is easier to separate via the centrifugation step compared to a less dense product, and pH around 4 was therefore found as the preferred pH. It was further visually observed that the rate of precipitation/flocculation increased with lower pH which is also of relevance in terms of process time/economy, 2.2 Effect of Temperature The pH of a 1 liter portion of the liquid was initially dropped to pH 3.9, maintaining the temperature at 70° C. No clouding occurred at this time. The sample was aliquoted out (100 ml aliquots) in order to test a range of different temperatures, both increasing and decreasing compared to the starting point. Temperatures tested: 80 C, 60° C., 50° C., 40° C., 30° C., and 20° C. The samples were visually observed for precipitate formation and further centrifuged in a bench top centrifuge to determine the degree of precipitation. At both 80° C. and 60° C., no appreciable precipitate formation was noted. At 50° C., clouding was observed, and a loose pellet (with dry solids content between 9-10%) representing approximately 9% of the total volume was spun down in the centrifuge. At all lower temperatures studied, precipitates formed and were easily spun down as more solid and dense pellets (with dry solids content close to 14%) in the centrifuge, representing 11-12% of the liquid volume (visual inspection of graduated centrifuge tubes)—such lower temperatures are therefore preferred.

Without wishing to be bound by theory, the above observations support a potential mechanism in which the lowering of the temperature as well as the pH (below the pka values of the fatty acids present in the aqueous dispersion) causes these fatty acids to be re-protonated into less soluble free fatty acids, and this effective removal of anionic "soaps" further leads to destabilization of dispersed and emulsified droplets of waxy molecules emanating from the straw, and these hydrophobic species then preferentially bind to silica, precipitated protein/peptide and polysaccharidic particles, alongside fine particles, in the aqueous phase, rather than remain in bulk water.

Example 3: Traditional Wax Refining Methods 3.1 Recovering Wax by Skimming

Dewaxing of wheat straw was performed as described in example 1.1, where the wax content of the process slurry from the aqueous, enzymatic dewaxing process was increased by centrifuging the slurry (using a decanter), yielding a liquid "top-phase" (liquid fraction comprising wax) and a fiber phase (insoluble fraction: bulk fiber residuals from the dewaxing step), where the liquid top-phase was then reused as bulk process liquor for a second batch for dewaxing. The dry matter contents of the decanter liquid top-phase of the three runs were determined by standard method and found to be the following: Run 1: 1.03%, Run 2: 1.76%, and Run 3: 3.30%. This confirmed that additional compounds (incl. wax) were indeed extracted with each additional run.

1980 g of the decanter top-phase liquid of run 3 was carefully and quantitatively dried down (80° C. oven). A total of 64.75 g of dry matter was obtained (confirming the 3.30% DM of run 3). 63.52 g of this dry substance was then extracted with standard chloroform Soxhlet extraction method to determine the total extractable waxy substance content. This yielded 5.73 g waxy material after CHCl3 flashing off. The chloroform extractable wax content of the decanter top-phase liquid of run 3 was thereby determined to be 0.29%.

The wax product obtainable by standard skimming was determined as follows: 121 liters of decanter top-phase liquid of run 3 in a rendering vessel. The pH of the mix was adjusted to 3.5 via addition of phosphoric acid. Samples were then periodically scraped/skimmed from the surface as follows. In each case, a visible skin with "fatty consistency" was observed and removed. The operation was performed 8 times over 2 days until no more waxy layer was observed to come to the surface. All collections were pooled, dried (80° C. oven, overnight) and weighed after drying. The dry weight of the pooled skimmed layer was 318 g. To determine the actual wax content of this layer, standard chloroform Soxhlet extraction method using boiling chloroform was used (2 hour reflux in 5× excess solvent). The CHCl3 and solubles were isolated via filtration and the solvent then flashed off, the waxy residues being finally weighed and quantified: the total chloroform extracted wax was 180 g.

As reported above, the initial analysis of the decanter top-phase liquid of run 3 showed the chloroform extractable wax content to be 0.29%. Hence, the total amount of wax in the 121 liters of decanter top-phase liquid is around 350 g. Method of skimming therefore appears to yield only 51% of the available wax at merely 57% purity. The skimmed wax product is not only crude in make-up and requires substantial further extraction, the method is also quite time consuming (1-2 days per batch) and is not considered as a realistic commercial method for wheat straw wax-refining 3.2 Wax Extraction by Alkali-Treatment and Neutralization Chopped wheat straw was suspended (to 8% consistency, i.e. 80 g per litre) in alkaline water (adjusted to, and maintained at, pH 11.5 via addition of 25% w/v NaOH solution) and stirred using a K-blade stirrer at a temperature of 80° C. for 2 hours. 80° C. was selected as this is above the known melting point of cereal straw waxy components and ensured any released material should be in a liquid/molten state. The scale of the test involved using 160 g wheat straw (dry matter basis) suspended in 2 litres of alkaline water. At the 2 hour time point, the sample was centrifuged (at 80° C.) and the supernatant water (circa 1.55 litres) was collected. 20% phosphoric acid was carefully added to this liquid phase to neutralize the solution (pH 7). No precipitation was observed, neither at the temperature during addition (75° C.), nor as temperature dropped towards ambient (20° C.). Centrifugation of the neutralized liquid yielded a negligible pellet in the centrifuge tube. Bringing the pH of the alkaline treated sample further down to around pH 4, some slight "hazing" was observed, but no separable precipitate was obtained as described in examples 1 and 2 of the present invention.

Example 4: Wax Bleaching 4.1 Bleaching Using Ozone

The cleaned wax (1 kg dose), after ethanol evaporation (example 1.2), was added to a 10 liter jacketed vessel containing hot water (9 liters) at temperature 85° C., with rapid stirring using a multi-bladed stirrer. The wax was allowed to melt and was dispersed using emulsion technology by raising the pH to circa 10.5 via addition of 3 M NaOH solution. Ozone (O3) was introduced (from an ozone generator) to the bottom of the vessel via a tube with multiple exit holes for increased bubble formation, and allowed to bubble through the liquid suspension for 4 hours, maintaining temperature and stirring throughout. The dosage rate of ozone was circa 20 g per hour output from the ozone generator. At the end of the treatment period, pH was lowered to a value between 3.5-4 using phosphoric acid (maintaining temperature and stirring), to help break remaining emulsion. The liquid suspension was rapidly discharged from the vessel to a separate container, at which point the melted, bleached wax raised to the top as a separate layer. The mix was allowed to cool to ambient temperature and the wax disc was removed as a solid. Residual water was dried off by wiping with absorbent paper.

The bleached wax was a light yellow color, as opposed to the dark brown color of the feed wax to the bleaching reactor. The light yellow shade was very similar to that standardly seen for carnauba wax. Using the Gardner color index (Table 2), the bleached wheat straw wax was visually determined to have a Gardner value around 8-10.

4.2 Bleaching Using Hydrogen Peroxide

The methodology for bleaching of beeswax using hydrogen peroxide was adapted: Wax was emulsified as described for ozone in example 4.1. 35 grams of 30% H2O2 was added per 100 grams of wax as the bleaching agent, maintaining pH at 10.5, and temperature at 80° C., for 5 hours and for 24 hours (two separate experiments). To recover the wax, the pH was dropped rapidly to 3.5 using phosphoric acid, maintaining stirring and temperature at 80° C., after which stirring was stopped and the wax phase rapidly separated to the top of the beaker as a distinct layer. On cooling, this top layer was removed as a solid wax disc. Only very partial lightening of the wax was observed, even after 24 hours treatment. The wax mass remained a brown color, visually determined to have a Gardner value around 18.

4.3 Bleaching Using Chlorine

Wax was added to hot water (1:10 ratio on mass basis), the mixture heated to 85° C. with rapid stirring. pH was reduced to 4.5 using acetic acid, with 10 g sodium chlorite per 100 g wax being added to the mix and bleaching commenced for 1 hour. Transition of the wax from dark brown to light yellow was observed (Gardner value around 8-10). The method therefore works, but chlorine bleaching is not desirable to most downstream processing and commercial use of the wax.

4.4 Bleaching Using Ozone, on Wax Dissolved in Chloroform

The crude wax was dissolved in warm chloroform (40° C.) at 1:10 by mass ratio. Ozone was bubbled through 1 liter of the mixture (rate of 10 g per hour from an ozone generator). The material visibly turned from dark brown to light yellow (Gardner value around 8-10) within 40 minutes of commencement. However, ozone reacts with chloroform to liberate active chlorine species, and it is likely that the bleaching was effected by these chlorine derived oxidants, alongside the ozone. Therefore, although effective bleaching was achieved, the "indirect" use of chlorine, and of chloroform, is likely not desirable to most downstream processing and commercial use of the wax.

The invention claimed is:

1. A method of extracting and refining cuticular wax from plant material, said method comprising the steps of
    a. providing plant material comprising cuticular wax,
    b. disassociating cuticular wax from said plant material provided in step (a) by subjecting said plant material to a dry mechanical treatment and suspending the dry mechanically treated material, or a fraction thereof, in an aqueous solution comprising protease and/or pectinase enzymes, thereby obtaining a sample comprising plant derived cuticular wax and dewaxed plant material in an aqueous suspension,
    c. solubilizing said plant derived cuticular wax by increasing the temperature of the sample obtained in step (b) to a temperature greater than the melting point of said plant derived cuticular wax,
    d. separating the suspension obtained in step (c) into a solid fraction and a liquid fraction, wherein said liquid fraction comprises melted plant derived cuticular wax,
    e. adjusting the pH and temperature of the liquid fraction from step (d) to pH 5.5 or lower and 50° C. or lower, respectively,
    f. separating the mixture obtained in step (e) into a waxy fraction and an aqueous fraction,
    g. recovering plant derived cuticular wax from said waxy fraction from step (f.

2. The method of extracting and refining cuticular wax from plant material according to claim 1, wherein said plant material comprising cuticular wax is selected from the group consisting of: cereal straws, grasses, rapeseed straw, maize stems, carnauba wax yielding plants, candelilla wax yielding plants and cactus.

3. The method of extracting and refining cuticular wax from plant material according to claim 1, wherein said plant material is cereal straw.

4. The method of extracting and refining cuticular wax from plant material according to claim 1, wherein said plant material is cereal straw selected from wheat, rye, barley, oats, sorghum, rice and triticale.

5. The method of extracting and refining cuticular wax from plant material according to claim 1, wherein the pH adjustment of the liquid fraction in step (e) is performed before the temperature adjustment.

6. The method of extracting and refining cuticular wax from plant material according to claim 1, wherein the temperature adjustment of the liquid fraction in step (e) is performed before the pH adjustment.

7. The method of extracting and refining cuticular wax from plant material according to claim 1, wherein the pH of the liquid fraction in step (e) is adjusted to pH 4.5 or lower.

8. The method of extracting and refining cuticular wax from plant material according to claim 1, wherein the temperature of the liquid fraction in step (e) is adjusted to between 30 and 40° C.

9. The method of extracting and refining cuticular wax from plant material according to claim 1, wherein the dry mechanical treatment comprises cutting, chopping and/or crushing.

10. The method of extracting and refining cuticular wax from plant material according to claim 1, wherein the plant derived cuticular wax is recovered in step (g) by solvent extraction using any solvent for wax.

11. The method of extracting and refining cuticular wax from plant material according to claim 1, wherein the recovery of plant derived wax in step (g) comprises
- I. mixing the waxy fraction from step (f) with hot alcohol to dissolve the wax,
- II. separating the hot suspension from step (I) into a solid fraction and a liquid fraction,
- III. cooling the liquid fraction from step (II) to a temperature which leads to the precipitation of the wax;
    wherein the temperature of said hot alcohol is above 40° C.; and wherein said alcohol is a C1-C4 alcohol.

12. The method of extracting and refining cuticular wax from plant material according to claim 1, further comprising the step of
- h. bleaching said recovered plant derived cuticular wax recovered in step (g), thereby obtaining a bleached plant derived cuticular wax.

13. The method of extracting and refining cuticular wax from plant material according to claim 12, wherein bleaching in step (h) is achieved by exposing said wax to a bleaching agent selected from the group consisting of oxidants, chlorine, hypochlorite, chloramine, chlorine gas, chlorine dioxide, sodium percarbonate, sodium perborate, molecular oxygen, ozone, peroxoacetic acid, benzoylperoxide, and bromate.

14. The method of extracting and refining cuticular wax from plant material according to claim 1, further comprising the step of
- i. formulating said recovered plant derived cuticular wax in step (g) into valuable products selected from the group consisting of: cosmetics, medical additives, personal care products, food ingredient, food coating, rodent bait, surface coatings, fertilizer coating, lubricants, molding, polishes, leather tanning, textile waterproofing, technical moisture barrier, garments, adhesive, inks, paints, crayons, pencils, barbeque fire starter, matches, and candle lights.

15. The method of extracting and refining cuticular wax from plant material according to claim 12, further comprising the step of
- i. formulating said bleached plant derived cuticular wax obtained in step (h) into valuable products selected from the group consisting of: cosmetics, medical additives, personal care products, food ingredient, food coating, rodent bait, surface coatings, fertilizer coating, lubricants, molding, polishes, leather tanning, textile waterproofing, technical moisture barrier, garments, adhesive, inks, paints, crayons, pencils, barbeque fire starter, matches, and candle lights.

16. The method of extracting and refining cuticular wax from plant material according to claim 2, wherein the carnauba wax yielding plants are Copernicia prunifera or Copernicia cerifera.

17. The method of extracting and refining cuticular wax from plant material according to claim 2, wherein the candelilla wax yielding plant is *Euphorbia antisyphilica*.

18. The method of extracting and refining cuticular wax from plant material according to claim 10, wherein the solvent for wax is a non-water miscible liquid.

19. The method of extracting and refining cuticular wax from plant material according to claim 11, wherein the $C_1$-$C_4$ alcohol is methanol, ethanol, propanol, iso-propanol, butanol, iso-butanol, tert-butanol, or any combination thereof.

20. The method of extracting and refining cuticular wax from plant material according to claim 12, wherein the bleaching in step (h) is achieved by exposing said wax to ozone.

* * * * *